United States Patent [19]

Beever et al.

[11] 4,405,767

[45] Sep. 20, 1983

[54] TREATMENT OF POLY(ARYLENE SULFIDE)

[75] Inventors: William H. Beever; Donnie G. Brady, both of Bartlesville, Okla.

[73] Assignee: Phillips Petroleum Company, Bartlesville, Okla.

[21] Appl. No.: 391,067

[22] Filed: Jun. 22, 1982

[51] Int. Cl.$^3$ .......................................... C08F 283/00
[52] U.S. Cl. ..................................... 525/537; 528/388
[58] Field of Search ......................... 525/537; 528/388

[56] References Cited

U.S. PATENT DOCUMENTS

| | | |
|---|---|---|
| 3,524,835 | 8/1970 | Edmonds, Jr. et al. ............ 528/388 |
| 3,737,411 | 6/1973 | Scoggins ............................. 528/388 |
| 4,038,261 | 7/1977 | Crouch et al. ...................... 528/388 |
| 4,064,114 | 12/1977 | Edmonds, Jr. ...................... 528/388 |
| 4,350,810 | 9/1982 | Tieszen et al. ..................... 525/537 |

*Primary Examiner*—Melvyn I. Marquis

[57] ABSTRACT

Novel poly(arylene sulfide) polymers having enhanced curing properties are produced by treating a poly(phenylene sulfide) polymer (1) at least one alkali metal sulfide; and (2) at least one N-alkyl lactam followed by the addition of (3) at least one polyhaloaromatic compound. The resulting polymers can be fabricated into shaped products having desirable properties.

8 Claims, No Drawings

TREATMENT OF POLY(ARYLENE SULFIDE)

This invention relates to novel group of poly(arylene sulfide) polymers and a process for making these poly(arylene sulfide) polymers.

Poly(arylene sulfide) polymers ranging in consistency from viscous liquids to crystalline solids are known. While such polymers exhibit desirable properties for many applications for use in molding compositions fibers, and films, the unmodified polymers normally possess a relatively high melt flow, e.g., above 4,000 which inhibits their use. For example, when exposed to process temperatures above their melting point the unmodified polymers tend to surface per-cure only and require excessive processing times or special apparatus for thin film processing. Since the desirable properties make the polymers extremely useful, it would be advantageous to improve the processability of the solid polymers without materially affecting the desirable properties.

The virgin poly(arylene sulfide) resin has a very high melt flow and it is known that it has to be cured or partially cured in order to make it possible to use it extensively. The extent of cure and the final melt flow which is attained depends upon the end use to which the polymer is to be put. For example, a fairly high melt flow can be used for fluid bend coating of metals while, for injection molding or compression molding, a much lower melt flow is desirable.

As taught in U.S. Pat. No. 3,919,177, it is known that in the production of p-phenylene sulfide polymer by employing a p-dihalobenzene, an alkali metal sulfide, and an organic amide, the use, additionally, of an alkali metal carboxylate results in a p-phenylene sulfide polymer of higher molecular weight, as evidenced by a higher inherent viscosity and a lower melt flow, than that obtained in the absence of an alkali metal carboxylate.

In U.S. Pat. No. 4,116,947, it is disclosed that branched poly(arylene sulfide) resins are prepared using, in addition to a p-dihalobenzene, a polyhaloaromatic compound having more than two halogen substituents per molecule which can be added to the reaction mixture after polymerization of p-dihalobenzene has begun. Polymers of low melt flow suitable for spinning into fibers are thus prepared.

The present invention provides novel poly(arylene sulfide) polymers for molding, extruding or spinning into fibers and which, because of the addition of polyhaloaromatic compounds after the polymerization is completed, exhibit enhanced curing capabilities compared to those poly(arylene sulfide) polymers prepared by initial addition of the polyhaloaromatic compound.

It is an object of this invention to provide novel group of polymers which have enhanced curing capabilities. A further object of this invention is to provide a process for producing these novel poly(arylene sulfide) polymers.

Other aspects, objects, and the several advantages of the present invention will be apparent to those skilled in the art upon a study of the specification and the appended claims.

In accordance with the present invention, a novel group of poly(arylene sulfide) polymers are provided by treating a poly(arylene sulfide) polymer in a novel process comprising:

(a) combining a poly(arylene sulfide) polymer, at least one alkali metal sulfide, and at least one N-alkyl lactam represented by the formula

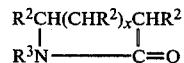

(where each $R^2$ is selected from the group consisting of hydrogen and $R^3$, $R^3$ is an alkyl radical having 1 to 3 carbon atoms, x is an integer of 1 to 3, and the total number of carbon atoms in the N-alkyl lactam is within the range of from about 5 to about 10) under temperature conditions sufficient to react the above ingredients; and (b) reacting the mixture from step (a) with at least one polyhaloaromatic compound represented by the formula $ArX_n$ (where each X is selected from a group consisting of chlorine, bromine, and iodine, n is an integer of 3 to 6 and Ar is a polyvalent aromatic radical of valence n which can have up to about 4 methyl substituents, the total number of carbon atoms in Ar being within the range of about 6 to about 16) such that the molar ratio of the polyhaloaromatic to the poly(arylene sulfide) polymer is in the range from about 0.08:1.0 to about 0.5:1.0 and the mole ratio of the alkali metal sulfide to the polyhaloaromatic compound is in the range from about 1.0:1.0 to about 1.0:1.3, at a temperature in the range from about 100° C. to about 450° C. for about 0.5 to about 10 hours.

The term "poly(arylene sulfide) polymer" as used in this specification is intended to include polymers of the type which are prepared as described in U.S. Pat. No. 3,354,129, issued Nov. 21, 1967, to Edmonds and Hill. As disclosed in this patent, these polymers can be prepared by reacting a polyhalo-substituted cyclic compound containing unsaturation between adjacent ring atoms and an alkali metal sulfide in a polar organic compound. The resulting polymer contains the cyclic structure of the polyhalo-substituted compound coupled in repeating units through a sulfur atom. The polymers which are preferred for use in this invention, because of their high thermal stability and availability of the materials from which they are prepared, are those polymers having the repeating unit —R—S— where R is phenylene, biphenylene, naphthylene, or a lower alkyl-substituted derivative thereof. By the term "lower alkyl" is meant alkyl groups having one to six carbon atoms such as methyl, propyl, isobutyl, n-hexyl, and the like. The preparation of such polymers is quite well disclosed in the above patent of Edmonds et al.

The polymers of this invention are preferably those which have melting temperatures above about 390° F. These poly(arylene sulfide) polymers can have a melting temperature anywhere in the range from about 390° F. to 940° F. Polymers of poly(phenylene sulfide) normally have melting temperatures in the range from about 500° F. to about 900° F.

The term "poly(arylene sulfide)" is meant to indicate not only homopolymers but also normally solid arylene sulfide copolymers terpolymers, and the like.

Polyhaloaromatic compounds used in the practice of this invention are those having more than two halogen substituents per molecule which can be utilized in preparing branched polymers. They can be represented by the formula $ArX_n$, where each X is selected from the group consisting of chlorine, bromine, and iodine, n is an integer of 3 to 6, and Ar is a polyvalent aromatic radical of valence n which can have up to about 4 methyl substituents, the total number of carbon atoms in Ar being within the range of 6 to about 16.

Examples of polyhaloaromatic compounds useful in this invention include
1,2,3-trichlorobenzene,
1,2,4-trichlorobenzene,
1,3- dichloro-5-bromobenzene,
1,2,4-triiodobenzene,
1,2,3,5-tetrabromobenzene,
hexachlorobenzene,
1,3,5-trichloro-2,4,6-trimethylbenzene,
2,2',4,4'-tetrachlorobiphenyl,
2,2',5,5'-tetraiodobiphenyl,
2,2',6,6'-tetrabromo-3,3',5,5'-tetramethylbiphenyl,
1,2,3,4-tetrachloronaphthalene, 1,2,4-tribromo-6-methylnaphthalene, and mixtures thereof.

Alkali metal sulfides which can be employed in the process of this invention include sodium sulfide, potassium sulfide, rubidium sulfide, cesium sulfide, and mixtures thereof. The alkali metal sulfide can be used in anhydrous form, as a hydrate, or as an aqueous mixture. If desired, the alkali metal sulfide can be produced by reaction of hydrogen sulfide or sodium bisulfide with sodium hydroxide in an aqueous medium. However, when the amount of free water and/or water of hydration present exceeds that specified hereinabove, excess water must be removed, e.g. by distillation, prior to the polymerization step.

N-Alkyl lactam which can be employed in the process of this invention can be represented by the formula

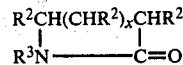

where each $R^2$ is selected from the group consisting of hydrogen and $R^3$, $R^3$ is an alkyl radical having 1 to about 3 carbon atoms, x is an integer of 1 to 3, and the total number of carbon atoms in the N-alkyl lactam is within the range of about 5 to about 10.

Examples of some N-alkyl lactams which can be employed in the process of this invention include
N-methyl-2-pyrrolidone,
N-ethyl-2-pyrrolidone,
N-isopropyl-2-pyrrolidone,
N,3-dimethyl-2-pyrrolidone,
N-propyl-5-methyl-2-pyrrolidone, N,3,4,5-tetramethyl-2-pyrrolidone,
N-isopropyl-4-propyl-2-pyrrolidone,
N-methyl-2-piperidone
N,6-diethyl-2-piperidone,
N-methyl-5-isopropyl-2-piperidone,
N-methyl-3-ethyl-2-piperidone,
N-methyl-2-oxohexamethylenimine,
N-ethyl-2-oxohexamethylenimine,
N-methyl-2-oxo-5-ethylhexamethylenimine,
N-propyl-2-oxo-5-methylhexamethylenimine,
N-methyl-2-oxo-3-propylhexamethylenimine,
N-methyl-2-oxo-7-isopropylhexamethylenimine, and mixtures thereof.

The mole ratio of the trihaloaromatic compound to the poly(arylene sulfide) polymer will be from about 0.08:1.0 to about 0.5 to 1.0.

The mole ratio of alkali metal sulfide (e.g. $Na_2S$) to the polyhaloaromatic compound will be from about 1.0:1.0 to about 1.0:1.3.

The novel poly(arylene sulfide) polymer having enhanced curing properties of the present invention can be produced by combining a conventional, known poly(arylene sulfide) polymer as described earlier and disclosed in U.S. Pat. No. 3,354,129 with at least one alkali metal sulfide and at least one N-alkyl lactam as described earlier. These ingredients should be combined under temperature conditions sufficient to react these ingredients. It is preferred that the mixture be heated to about 200° C.

After the above procedure has been carried out, the polyhaloaromatic compound represented by the formula $ArX_n$ should be added and mixed with the other ingredients. The resulting mixture should then be heated at a temperature from about 100° C. to about 450° C. for about 0.5 to about 10 hours.

The poly(arylene sulfide) polymers produced by the process of the present invention can be further treated by separating the produced polymers from the reaction mixture by a conventional means, e.g. filtration, followed by washing the polymer with any inert solvent such as acetone, followed by drying according to any conventional means. An inert solvent is defined as being any solvent which does not react with the produced polymer.

Differential Thermal Analysis (DTA) can then be employed to measure the $T_g$ (glass transition temperature), $T_c$ (crystallization temperature), and $T_m$ (melting temperature) of the particular poly(arylene sulfide) polymer.

Then the polymer can be cured at a desired temperature and time, preferably at about 260° C. for 1 and 6 hours. The melt flow rate of the cured polymer can be determined by any procedure such as ASTM D 1238 using a 5 Kg weight at 600° F. (316° C).

The polymers produced by the process of this invention can be extruded into sheet, film, pipe, or profiles, spun into fibers, or blow molded, injection molded, rotational molded, or compression molded into desired shapes. The polymers also can be used in the production of coatings. If desired, the polymers can be blended with fillers, pigments, extenders, other polymers, and the like. For example, fiber glass can be added to the polymers to improve physical properties such as tensile strength, flexural modulus, and impact resistance. If desired, the polymers in shaped form can be annealed to improve physical properties such as flexural modulus, flexural strength, tensile strength, and heat deflection temperature.

EXAMPLES

Example I

This example is the invention illustrating the procedure used to post-treat the polymers disclosed herein and the subsequent evaluation. The general procedure is as follows: To a stainless steel stirred reactor was added 64.9 grams (0.6 mole) polyphenylene sulfide polymer V-1 from Phillips Petroleum Co. (mp 545F by Differential Thermal Analysis, melt flow 4000–6000 grams per 10 minutes using a 5 kg weight at 600° F.) according to ASTM D 1238, 15.5 grams (0.12 moles) $Na_2S$ and 100 milliliters of N-methylpyrrolidone. With stirring the mixture was heated to 215° C. (419° F.) and then allowed to cool to about 115° C. (239° F.) whereupon 18.2 grams (0.1 mole) of 1,2,4-trichlorobenzene was added. The stirred mixture was heated to 245° C. (473° F.) 90–100 psi 1.75 hours and allowed to cool to ambient room temperature overnight. The contents were diluted with 500 milliliters of tap water, stirred and filtered. The solid residue was chopped in a Welex blender along with enough additional hot water to facilitate grinding, filtered, washed with acetone, extracted overnight with acetone, filtered and air dried. Differential thermal analysis (DTA) revealed the sample had the following properties, Tg 85° C. (185° F.), Tc 140° C. (284° F.), Tm 277° C. (531° F.). After heating (cured) at 264° C. (507° F.) for 1 hour, the sample had a melt flow of 0.15 grams/10 minutes using a 5 kg weight. After heating at 264° C. (507° F.) for 6 hours the melt flow was 0 grams/10 minutes. A repeat curing of the above example resulted in a melt flow of 4 after 1 hour curing at 264° C. (507° F.).

Example II

This example is a control illustrating that when a dihaloaromatic compound is used in place of a trihaloaromatic the melt is higher than the inventive process which suggests a longer cure time required with the dihaloaromatic-treated polymer. The procedure described in Example I was repeated except 0.1 mole of 1,2,4-trichlorobenzene was replaced with 22.1 grams (0.15 mole) of 1,4-dichlorobenzene. After a 1 hour curing at 264° C. (507° F.) the melt flow could not be measured because the polymer flowed around the melt flow plunger. After a 6 hour cure the melt flow was 1140.

SUMMARY

The preceding data are summarized in Table I wherein it is seen that polyphenylene sulfide polymer post-treated with 1,2,4-trichlorobenzene in a hot Na$_2$S, N-methylpyrrolidone solution results in new polymer having a lower melt flow value than either the base polyphenylene sulfide polymer alone or a similar polymer prepared by adding 1,2,4-trichlorobenzene near the end of the original polymerization process to make polyphenylene sulfide polymer. The data also show that post-treating polyphenylene sulfide polymer with 1,4-dichlorobenzene does not produce a product with a lower melt flow but actually results in a product with a higher-than-usual melt flow.

We claim:
1. A process for treating a poly(arylene sulfide) polymer comprising:
(a) combining a poly(arylene sulfide) polymer, at least one alkali metal sulfide, and at least one N-alkyl lactam represented by the formula

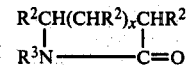

where each $R^2$ is selected from the group consisting of hydrogen and $R^3$, $R^3$ is an alkyl radical having 1 to 3 carbon atoms, x is an integer of 1 to 3, and the total number of carbon atoms in the N-alkyl lactam is within the range of from about 5 to about 10 under temperature conditions sufficient to react the above ingredients; and
(b) reacting the mixture from step (a) with at least one polyhaloaromatic compound represented by the formula ArX$_n$ where each X is selected from a group consisting of chlorine, bromine, and iodine, n is an integer of 3 to 6 and Ar is a polyvalent aromatic radical of valence n which can have up to about 4 methyl substituents, the total number of carbon atoms in Ar being within the range of about 6 to about 16 such that the molar ratio of the polyhaloaromatic to the poly(arylene sulfide) polymer is in the range from about 0.08:1.0 to about 0.5:1.0 and the mole ratio of the alkali metal sulfide to the polyhaloaromatic compound is in the range from about 1.0:1.0 to about 1.0:1.3, at a temperature in the range from about 100° C. to about 450° C. for about 0.5 to about 10 hours.

2. A process according to claim 1 wherein the poly(arylene sulfide) polymer is further treated by separating said polymer from the reaction mixture, followed by washing with an inert solvent, followed by drying.

3. A process according to claim 1 wherein said alkali metal sulfide is sodium sulfide, said polyhaloaromatic is trichlorobenzene and said N-alkyl lactam is N-methyl-2-pyrrolidone.

4. A process according to claim 1 wherein said poly-

TABLE I

| SUMMARY EFFECT OF POST-TREATING POLYPHENYLENE SULFIDE (PPS) POLYMER | | | | | |
|---|---|---|---|---|---|
| | Melt Flow$^a$ after Curing | | DTA$^b$ | | |
| | 1 Hr/507° C. | 6 Hrs./507° C. | Tg | Tc | Tm |
| A. Controls: | | | | | |
| 1. PPS - Original, no treatment | 392 | 47 | 87° C. | 125° C. | 277° C. |
| 2. PPS - Cl$_3\phi$ modified$^c$, no post-treatment | 9(36)$^d$ | — | — | — | — |
| 3. PPS - treated with 1,4-dichlorobenzene | Flows | 1140 | — | — | — |
| B. Invention: | | | | | |
| 1. PPS - treated with 1,2,4-trichlorobenzene as in Example I | .15 | 0 | 85 | 140 | 277 |
| Repeat - | | .5 | — | 85 | 140 | 280 |

$^a$Using 5 kg weight at 600° F. (316° C.) according to ASTM D 1238
$^b$Differential Thermal Analysis
$^c$1,2,4-Trichlorobenzene added near the end of the polymerization process of reacting dichlorobenzene, Na$_2$S, N—methylpyrrolidone solvent to give a slightly different grade of polyphenylene sulfide
$^d$Duplicate sample.

Reasonable variation and modifications are possible in the scope of the foregoing disclosure and the appended claims.

(arylene sulfide) polymer is poly(phenylene sulfide).
5. A composition made according to the process of claim 1.

6. A composition according to claim 5 wherein said poly(arylene sulfide) polymer is poly(phenylene sulfide).

7. A composition according to claim 5 wherein said alkali metal sulfide is sodium sulfide, said polyhaloaromatic compound is trichlorobenzene, and said N-alkyl lactam is N-methyl-2-pyrrolidone.

8. A composition according to claim 5 wherein the poly(arylene sulfide) polymer is further treated by separating said polymer from the reaction mixture, followed by washing with an inert solvent, followed by drying.

* * * * *